July 13, 1943.  E. WILDHABER  2,324,182
METHOD OF PRODUCING GEARS
Original Filed Dec. 31, 1937   4 Sheets-Sheet 1
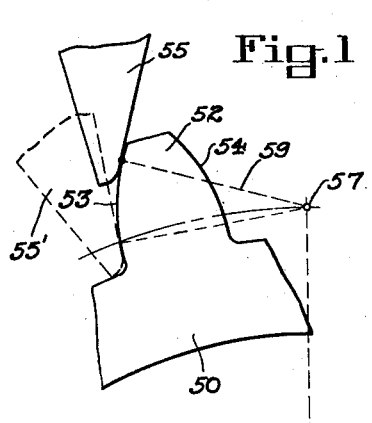
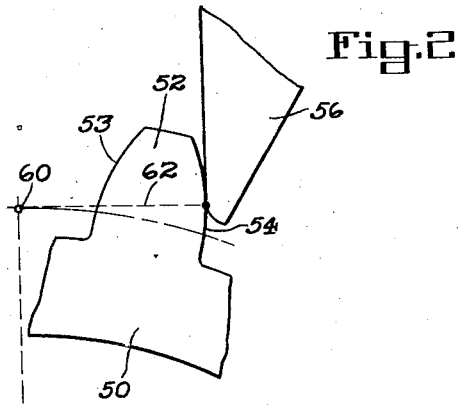
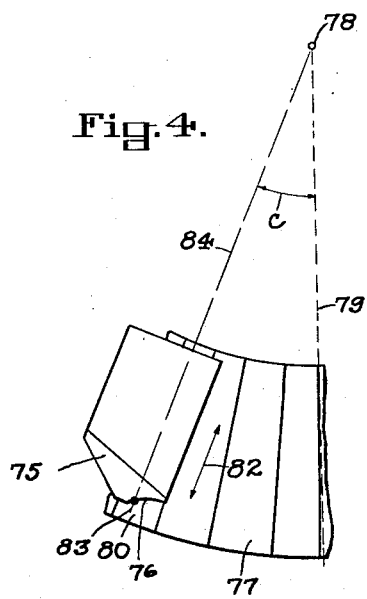
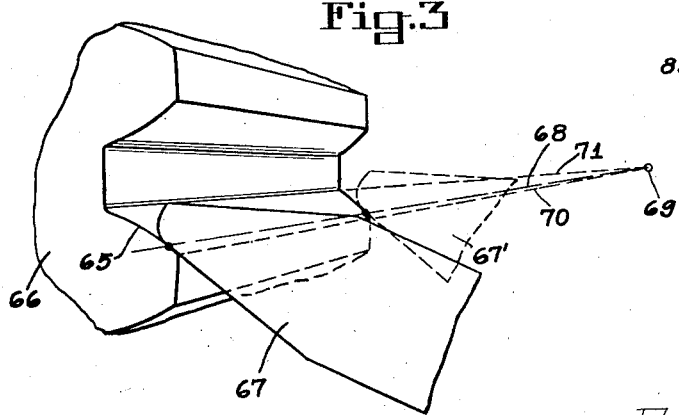
Inventor
Ernest Wildhaber
Attorney July 13, 1943.  E. WILDHABER  2,324,182
METHOD OF PRODUCING GEARS
Original Filed Dec. 31, 1937  4 Sheets-Sheet 2

Inventor
*Ernest Wildhaber*
Attorney

July 13, 1943.  E. WILDHABER  2,324,182
METHOD OF PRODUCING GEARS
Original Filed Dec. 31, 1937   4 Sheets-Sheet 3

Inventor
Ernest Wildhaber
Attorney

July 13, 1943.  E. WILDHABER  2,324,182

METHOD OF PRODUCING GEARS

Original Filed Dec. 31, 1937   4 Sheets-Sheet 4

Ernest Wildhaber
INVENTOR

BY
ATTORNEY

Patented July 13, 1943

2,324,182

UNITED STATES PATENT OFFICE 2,324,182

METHOD OF PRODUCING GEARS

Ernest Wildhaber, Brighton, N. Y., assignor to Gleason Works, Rochester, N. Y., a corporation of New York Original application December 31, 1937, Serial No. 182,837, now Patent No. 2,230,418, dated February 4, 1941. Divided and this application February 3, 1939, Serial No. 254,453

16 Claims. (Cl. 90—6)

The present invention relates to gears and to their manufacture and particularly to straight tooth gears, spur, helical, bevel and hypoid and to the manufacture of such gears. The invention comprises a new process of making gears and a new form of gearing. This application is restricted to the process and is a division of my copending application, Serial No. 182,837, filed December 31, 1937, now Patent No. 2,230,418, granted February 4, 1941, which covers the novel gearing.

A primary purpose of the invention is to provide a method of producing straight tooth gears by which both members of a pair may be cut without generating roll to a high degree of accuracy, with a tooth surface finish comparable to that obtained in a generating process, and in a simple, fast operation.

A further purpose of the invention is to provide a process for cutting straight tooth gears without generating roll in which side-cutting tools may be employed, with the result that the tools will have longer life, cut faster and produce a better tooth surface finish than tools heretofore commonly employed in the form-cutting of straight tooth gears.

Another object of the invention is to provide a method for grinding straight toothed gears and particularly straight bevel gears which will be comparable in simplicity and speed of operation with the process of grinding nongenerated spiral bevel gears which is now in use.

Still another object of the invention is to provide a process for producing straight tooth gears without generating roll in which the teeth of the two members of a pair may be made to have less than full profile contact and less than full length contact when run in mesh so that the gears may readily accommodate themselves to any variations in mountings or loads which may be met with in use.

Other objects of the invention will be apparent hereinafter from the specification and from the recital of the appended claims.

The process most usually employed heretofore for the form-cutting of straight tooth gears, particularly straight tooth bevel gears, has been the planing process. In this method of cutting, the blank is held stationary on its axis and the cutting tool is reciprocated across the face of the blank while a relative depthwise feed is produced between the tool and blank under control of a template which has a profile-shape corresponding to the profile-shape of the tooth surface which it is desired to cut on the blank. When the tooth surface has been cut to full depth, the tool is withdrawn and the blank indexed. Separate templates are required for cutting the opposite side tooth surfaces of the blank.

The planing process has the advantage of extreme simplicity and a very simple form of gear cutting machine may be employed for the purpose. The planing process is one of the oldest methods of cutting gears and planing machines, such as the machine shown in the Gleason Patent No. 678,337, of July 9, 1901, are still attractive on account of their outstanding simplicity. These machines and the process have the disadvantages, however, that a template must be employed to control the tooth shape and that cutting has had to be done with a point-cutting tool. Templates are difficult to manufacture with accuracy and the cutting action of a point-cutting tool is such as to produce a poor tooth surface finish and is, moreover, relatively slow.

The present invention is not limited, however, as to the type of tool which may be employed. Gears may also be milled and ground. From the standpoint of planing, however, all the drawbacks of the template-controlled planing process are overcome by the present invention. Further than this, machines employed to cut gears according to the present invention can be made even simpler than prior types of gear planing machines.

The present invention is based upon the production of tooth surfaces of circular arcuate profile curvature. Each member of the pair is provided with tooth profiles which are single convex circular arcs or which closely approximate single, convex circular arcs. In the cutting of such gears, the tool is reciprocated across the face of the blank while being fed relative to the blank into depth, but, instead of feeding the tool into depth under control of a template, the feed movement is effected about a relatively fixed axis, the axis of profile curvature of the tooth surface. The feed movement of the tool, then, can be a simple swinging movement about a fixed pivot. The inaccuracies inherent, wherever a template is employed, are eliminated and the machine construction is very much simplified. In addition, gears can be cut with this invention with tools having straight side cutting edges and in this way, the speed and accuracy of a generating process can be obtained. In fact, by using a planing tool, that has a concave side-cutting edge, a better tooth surface finish can be obtained than in a generating process or the same finish can be secured but in a shorter time.

As already stated, however, the invention is by no means confined to the cutting of gears with planing tools. Due to the tooth shape produced (circular arcuate or approximately circular arcuate) it is possible to mill or grind the gears very readily. The milling cutter or grinding wheel may have an operating surface of either straight or concave (circular arcuate) profile shape. The rotating cutter or grinding wheel, as is the case with the planing tool, is reciprocated across the face of the blank and is rocked about the center of curvature of the tooth profile while being fed into depth. The milling cutter or grinding wheel may be made with a radius of profile curvature different from the radius of profile curvature of the tooth surface to be cut or ground or the cutter or wheel may have the same profile curvature as the work.

The invention may be applied equally to the production of gears whose teeth are inclined to the straight line elements of their pitch surfaces, such as helical gears, skew bevel gears, etc., as well as to the production of gears whose teeth extend along the straight line elements of their pitch surfaces such as spur gears, straight bevel etc. In the case of gears with helical or skew teeth and broadly where the bottoms of the tooth spaces of the gears are inclined to the straight line elements of the cylindrical or conical pitch surfaces of the gears, a motion is provided about the axis of the tooth surface being cut so that the tool may follow the desired tooth space bottom when it cuts the lowest part of the tooth flank. This motion is in addition to the other motions required to produce the tooth surface and does not affect the shape of the tooth surface proper but only the shape of the tooth bottom. It does not therefore require the high accuracy of a timed motion.

Ordinarily gears are cut according to the present invention in an intermittent indexing process. The invention, however, is not limited in use to such a process. If desired, the present invention may also be employed in the cutting of gears according to a continuous indexing process, where the tool is reciprocated along the length of the gear tooth and the blank is rotated continuously in timed relation with the tool movements so that the tool cuts in a different tooth space of the blank on each cutting stroke. In such case, the desired tooth profile curvature may easily be obtained by producing a relative movement during cutting about the center of profile curvature of the tooth surface to be produced. No generating motion is required. The correcting motion now used on a machine of the continuous indexing type where a crank driven tool is employed may be retained, if desired, however. This motion eliminates the S-curve which would otherwise be produced and enables the two members of a gear pair to be cut so that they have a suitable localized tooth bearing when run in mesh.

Localization of tooth bearing may also be produced by cutting the two members of a pair of gears so that the straight elements of the mating tooth surfaces of the gears are disposed at a slight angle to one another as disclosed in my prior Patent No. 1,733,326 of October 29, 1929.

With the present invention, tooth surfaces may be cut on a pair of straight tooth gears which are either circular cylindrical or circular conical surfaces. The modification by which convex circular cylindrical surfaces may be cut upon both members of a pair of tapered gears is a special but important embodiment of this invention. This modification of the invention solves the heretofore difficult problem of a practical tooth shape for bevel and hypoid gears which will permit these gears to be ground with very simple means and without generating roll. With this embodiment of the invention, all that is required is to provide a milling cutter or a grinding wheel of circular arcuate profile curvature and to move the cutter or grinding wheel along the tooth surface to be produced, that is, along the axis of the cylindrical surface, while effecting movement of the tool about said axis to cause the tip of the tool to follow the desired tooth bottoms. In many cases, moreover, the latter motion may be omitted. The present invention, then, enables us to grind spur and tapered gears very accurately with the most efficient grinding contact, namely, contact along the (circular) profile of the grinding wheel. This contact is analogous to the profile contact between the grinding wheel and work obtained when grinding non-generated spiral bevel gears according to the known method which has proved extremely successful in practice.

In cutting the two members of a pair of unequal gears according to the present invention, the mating tooth surfaces of the pair are preferably cut with different radii of curvature. The radius of profile curvature of the tooth surfaces of the pinion is preferably made larger than the curvature radius of the profile of a corresponding involute tooth and the radius of profile curvature of the tooth surfaces of the gear is preferably made smaller than the radius of curvature of a corresponding involute tooth profile. In this way, gears are obtained which will transmit uniform motion.

The circular arcuate profiles of the teeth of gears cut according to the present invention have a slight relief at the tops and bottoms of the teeth as compared with teeth of true involute profile curvature. This is just what is desired in practice. In fact, such modification of profile curvature is so desirable that involute teeth are commonly modified to have relief at the tops and bottoms of the teeth. In the case of involute gears, however, this requires a modification in profile shape of the tools employed to cut the gears or a modification of the motions of the machine employed in the production of the gears. The desired relief at the tops and bottoms of the tooth profiles is, however, a natural result of the present invention and does not add to the cost of the tools or complicate the cutting machine.

In the drawings:

Figs. 1 and 2 are diagrammatic views illustrating, respectively, the method of cutting opposite sides of a tooth of a gear according to one embodiment of this invention;

Fig. 3 is a diagrammatic view further illustrative of this method as applied to the production of bevel gears;

Fig. 4 is a plan view illustrating the method of cutting a bevel gear according to a slightly different embodiment of the invention;

Figure 5:
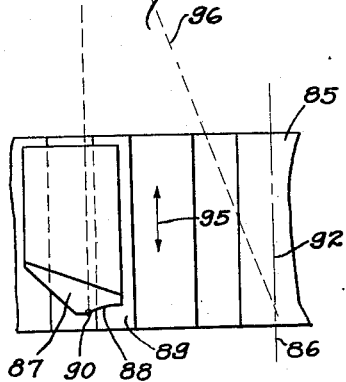
Figs. 5 and 6 are a fragmentary plan view and side elevation, respectively, illustrating the application of the method shown in Fig. 4 to the cutting of spur gears.

Figs. 1 and 2 illustrate the application of the planing method of cutting to the production of gears according to the present invention. Either spur or bevel gears may be cut in this way. The two sides of the teeth of the gear are cut separately.

50 designates the gear to be cut and 51 is its axis. 52 is a tooth of the gear and 53 and 54 are the opposite sides of the tooth. 55 is the planing tool for cutting one side 53 of the teeth and 56 is the planing tool for cutting the opposite side 54 of the teeth. These tools have straight-sided cutting edges, but may be rounded, as shown, at their tips according to conventional construction.

The tooth surface 53 to be cut is of circular arcuate profile shape and has its center at 57 and a radius of curvature 59. The opposite side tooth surface 54 has a center of curvature at 60 and a radius of curvature 62.

In cutting the tooth side 53, the gear 50 is held stationary on its axis 51 and the planing tool 55 is reciprocated back and forth along the length of the gear tooth while a slow relative feed movement is produced between the tool and the gear blank about the axis 57 of profile curvature of the tooth surface to be cut. In Fig. 1, this feed movement is illustrated as applied to the tool so that during the cutting operation, the tool moves from the full line position indicated at 55 to the dotted line position indicated at 55'. When the tool has reached full depth position, the tooth side 53 is completed. The tool then is swung back about the axis 57 until it clears the blank and then the blank is indexed. After all of the sides 53 of the teeth of the blank have been cut, the planing machine is set up for cutting the other sides 54 of the teeth and these tooth sides are then cut with the tool 56 in the same way as the sides 53 were cut, namely by reciprocation of the tool along the length of the gear tooth and relative feed of the tool about the profile center or axis 60.

In planing the teeth of either a spur or a bevel gear, the planing tool is, of course, reciprocated in the direction of a straight line element of the tooth surface being produced. For bevel gears, the straight line elements of the tooth surfaces ordinarily intersect in the cone apex of the gear. Thus, as shown in Fig. 3, in planing the tooth surface 65 of the bevel gear 66, the planing tool 67 will ordinarily be reciprocated along lines 68 which intersect in the gear apex 69. 70 is an element of the tooth surface at the top of the tooth profile and 71 is an element of the tooth surface at the root of the tooth profile. The tool is shown in full lines at 67 at one end of its stroke and in dotted lines at 67' at the opposite end of the cutting stroke. By reciprocating the planing tools along lines differently inclined to the pitch surfaces of mating gears, however, in a manner similar to that described in my Patent No. 1,733,326 above mentioned, mating tooth surfaces can be produced on a pair of gears which will mismatch one another and so a localization of tooth bearing may be obtained.

Mating gears of different tooth numbers are preferably cut so that their tooth surfaces have different radii of curvature as already stated and as described more fully in my copending application Ser. No. 182,837.

By using a planing tool that has a concave cutting edge, a better tooth surface finish can be obtained than with a straight sided tool. In fact, the use of such a tool offers the possibility of even securing a better tooth surface finish than can even be obtained in a generating process or the same finish may be secured but in a shorter time. The use of tools having concave cutting edges is illustrated in Figs. 4 to 6 inclusive.

Fig. 4 shows the cutting of one side surface of a tooth of a bevel gear with such a tool. The tool is denoted at 75 and it has a concave side-cutting edge 76. 77 denotes the gear and 78 is its apex. 79 is the axis of the conical tooth surface 80 which is to be produced. In cutting the gear, the tool is reciprocated in direction 82 so that its point of contact 83 moves along a line 84 radial of the gear apex 78, and simultaneously with the reciprocating movement, the tool is fed gradually about the axis 79 into full depth position. The tool path 84 includes an angle $c$ with the axis 79 of the tooth surface being cut. This angle varies, of course, for different gears, but a machine may be made to cut different gears simply by providing an adjustment of the tool slide about gear apex 78.

Figure 6:
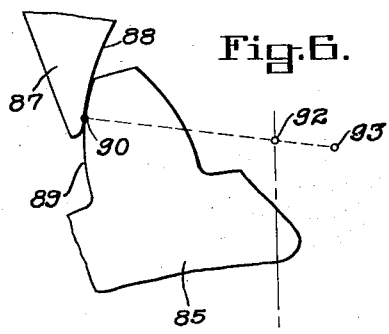

The use of a planing tool having a concave cutting edge is further illustrated in Figs. 5 and 6 in connection with the cutting of a spur gear. Here 85 denotes the gear to be cut and 86 is its axis. 87 is the cutting tool and 88 denotes the concave cutting edge of this tool. 89 is the tooth surface which is to be cut with the tool 87. The tool is shown in contact with this tooth surface at the point 90. The axis of profile curvature of the tooth surface 89 is denoted at 92. The radius of curvature 90—93 of the cutting edge 88 of the tool 87 is larger than the radius 90—92 of profile curvature of the tooth surface 89 to be cut. It will be evident, however, that the concave cutting edge of this tool will follow the convex tooth profile 89 better than a straight sided cutting tool because the concave cutting edge differs less from the tooth profile to be produced. Hence, with a tool having a concave cutting edge, a better tooth surface finish may be obtained.

In cutting the gear 85, the tool is reciprocated, as before, in the direction of tooth length, here denoted at 95 and is fed about the axis 92 of profile curvature of the teeth. Here the direction 95 is parallel to the axis 92 and, for spur gears, is also parallel to the gear axis 86. The tooth surface cut on the gear, then, is a cylindrical surface whose axis is at 92. After one tooth surface of the gear has been cut, the tool is withdrawn and the blank indexed. After all the tooth surfaces at one side of the teeth have been cut, the opposite sides of the teeth may be cut with a tool having a cutting edge suitable for cutting such sides.

In a helical gear, the teeth are, of course, inclined to the gear axis. In Fig. 5, we have shown diagrammatically how a helical gear may be produced. The teeth of this gear are assumed to extend in the direction 95 and the axis of the gear is assumed to have the position indicated by the dotted line 96. The cutting motion employed in cutting a helical gear differs from that used for cutting a spur gear because of the inclination of the teeth of the helical gear to its axis. The cutting motion, for helical gears, should be a helicoidal motion, as denoted by the arrow 97, about the axis 96 of the gear. This means that the tool must be reciprocated in the direction of the axis 96 while the gear is being turned about that axis or that the tool may be held stationary while the work is being reciprocated in the direction of and rotated about the axis 96. In addition to this helicoidal motion about axis 96, a relative feed movement is produced between the tool and gear about axis 92 to produce the desired profile curvature of the gear tooth, as before.

Figure 7:
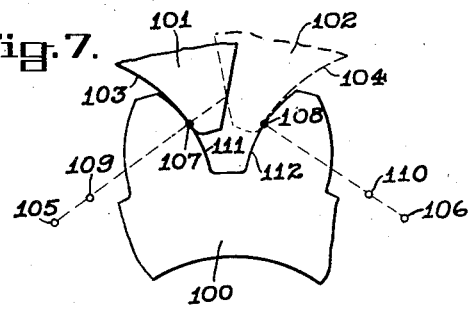
Figs. 7, 8 and 9 are diagrammatic fragmentary end elevational views, illustrating various ways of employing a pair of tools to cut simultaneously opposite side tooth surfaces of a gear by the process of the present invention.
Figure 8:
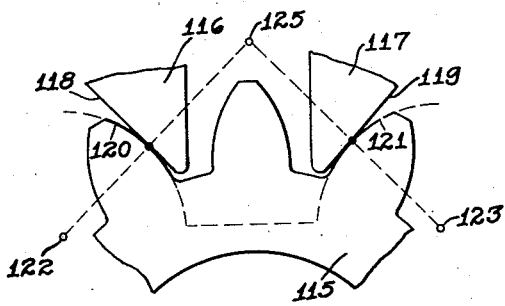
Figure 9:
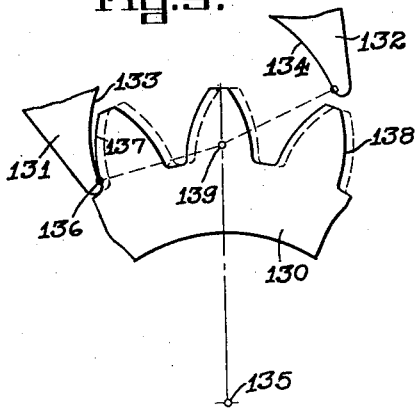

In Figs. 7 to 9 inclusive, I have illustrated various ways of employing two tools to cut spur, helical and tapered gears according to this invention. In Fig. 7, 100 denotes the gear to be cut and 101 and 102 are the tools which are employed to cut the tooth surfaces of this gear. The tools here shown have concave cutting edges 103 and 104, respectively, whose centers of curvature are at 105 and 106, respectively, and whose radii of curvature 107—105 and 108—106, respectively, are greater than the radii of curvature 107—109 and 108—110, respectively, of the tooth surfaces 111 and 112, respectively, which the tools are to cut. In Fig. 7, the two tools are shown adjusted to operate on opposite sides 111 and 112 of the same tooth space. Here the two tools are arranged so as to cut in opposite directions, one tool being slightly withdrawn for clearance while the other one is cutting. One tool cuts on the stroke in one direction and the other on the return stroke and the tooth profiles are produced, as before, by feeding the reciprocating tools about the axes 109 and 110, respectively, of profile curvature of the tooth surfaces to be produced. The gear is held stationary on its axis during cutting and when a pair of tooth surfaces have been completed, the tools are withdrawn from engagement with the blank and the blank indexed.

Fig. 8 shows a set-up in which the two tools operate in different tooth spaces of the gear blank being cut. The blank is here denoted at 115 and the tools at 116 and 117, respectively. Here the tools have straight cutting edges 118 and 119, respectively. With such tools, the feed motion is preferably imparted to the gear. It consists of a motion such that the two tooth sides 120 and 121, which are to be cut, will remain in contact with the stationary plane surfaces 118 and 119 represented by the tool throughout the whole of the feed movement. This feed motion may be obtained by using cams and abutments. The cams will have cylindrical or conical cam surfaces, depending upon whether spur or tapered gears are being cut, whose centers coincide with the axes 122 and 123, respectively, of profile curvature of the tooth surfaces 120 and 121 to be produced. The abutments will have plane surfaces representing the planes 118 and 119 or planes parallel thereto. The cams will be secured to the gear in such way as to bear against the abutments. By rocking the gear about its axis, then, as the tools are reciprocated back and forth in the planes 118 and 119, respectively, tooth surfaces 120 and 121 of the desired profile curvature can be produced on the gear blank. When a pair of tooth surfaces has been completed, the tools are withdrawn from engagement with the blank and the blank indexed. Instead of reciprocating tools, plane-sided grinding wheels may be used, as will readily be understood.

The motion obtained in cutting a gear by the method illustrated in Fig. 8 is actually a rolling motion and it can readily be demonstrated that on a spur gear, the motion is as if a circle of the gear would roll on a stationary circle twice its diameter. The rolling circle of the gear passes through the centers 122 and 123 of the profile curvature and the point 125 which is the point of intersection of the tooth normals.

In Fig. 9, I have illustrated particularly a method of finish-cutting with two planing tools. The gear is here designated at 130 and the tools at 131 and 132. The tools have concave cutting edges 133 and 134, respectively. The tools are here shown in the positions which they occupy at the start of the finishing cut. It is assumed that the final finish contours of the gear teeth are then in the positions shown in dotted lines so that both tools clear the work. As the tools reciprocate back and forth in the positions shown, the blank is first turned slowly about its axis 135 toward the tool 131 until it reaches the position shown in full lines. In this position, the point 136 at the root of the tooth profile 137 is formed. The blank is now held stationary on its axis and the tool feed movement starts. In the instances shown, the tooth profiles 137 and 138 are both curved about a common axis 139. The feed movement of the tools is, then, of course, about this axis. This feed movement is such that as the tool 131 moves outwardly to finish cut the profile 137 from the root to the tip thereof, the tool 132 will move inwardly to finish-cut the profile 138 from the tip to the root thereof. At the end of the feed movement, the tool 132 will have reached full-depth position and the tool 131 will have cleared the work. The reciprocating movements of the tools are then stopped, the tools are returned to starting position and the blank is indexed. The indexing motion is so retarded that the teeth of the blank, after indexing, will be in a position corresponding to that shown in dotted lines so that after the tools start to cut on new tooth surfaces of the blank, the first movement will again be a slow turning motion of the blank about its axis from the dotted line to the full line position.

The method of cutting illustrated in Fig. 9 requires a special tooth design since the axis 139 of profile curvature of the tooth surfaces must be on the center line of a tooth or of a tooth space of the gear. This requirement is easily met, however, by standardizing on gears of suitable tooth numbers.

It will be obvious that the various modifications of the invention described above may be practiced by using milling cutters or grinding wheels in place of the planing tools. For the planing tools having concave cutting edges, then, milling cutters or grinding wheels having concave cutting profiles may be substituted and instead of planing tools having straight cutting edges, milling cutters or grinding wheels may be employed whose active surfaces are plane surfaces perpendicular to the axes of the cutters or wheels.

Figure 10:
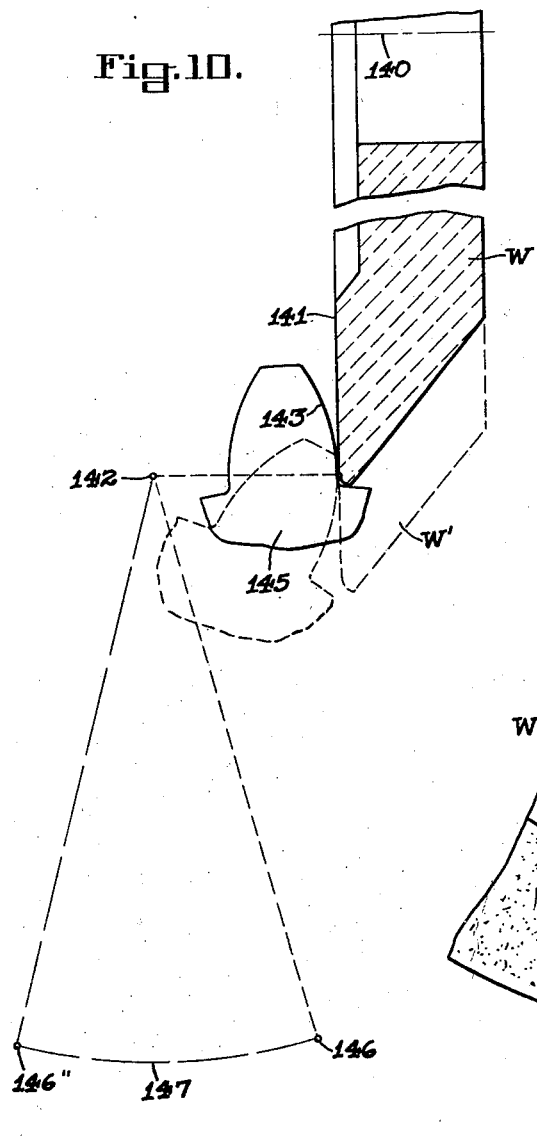
Figs. 10 and 11 are fragmentary views taken at right angles to one another and illustrating one way of grinding a straight bevel gear according to the present invention.
Figure 11:
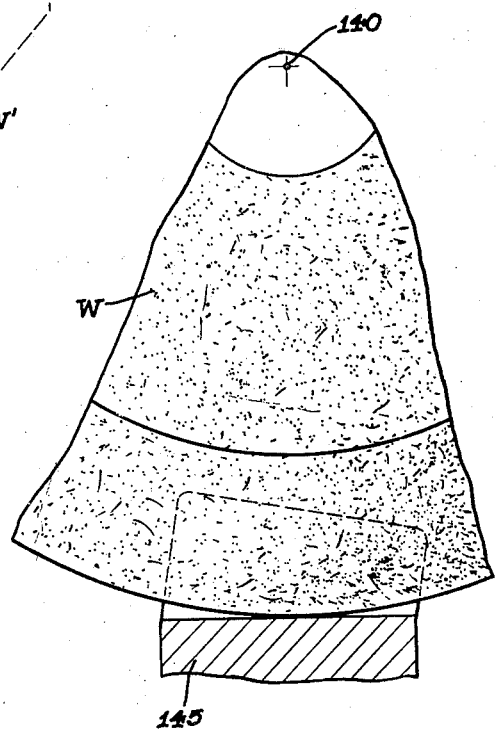

Figs. 10 and 11 illustrate a further application of the invention to the grinding or milling of gears with a plane-sided cutter or wheel of large diameter. In the drawings, I have shown a grinding wheel W whose axis is at 149 and which has a plane grinding surface 141. Here the diameter of the grinding wheel is so large that no movement along the length of the gear tooth is required. The feed movement about the axis 142 of the conical or cylindrical tooth surface 143 which is to be ground is in this instance preferably imparted to the gear blank 145. Two positions of the gear tooth are shown in full lines and in dotted lines, respectively, at the beginning and near the end of the feed movement about axis 142. In the position shown in full lines, the axis of the gear is at 146. During grinding, the gear is swung about the axis 142, which is perpendicular to the drawing plane, to and beyond the position shown in dotted lines. The gear axis moves, in this swinging motion on circle 147 to and beyond position 146″.

In order to distribute the wear on the grinding wheel more evenly and to spread it over a larger area, the wheel may be moved in the plane of its active surface during the feed movement. Thus, it may be moved from the full line position shown to the dotted line position denoted at W′ in Fig. 10. This movement may be timed to movement of the gear about axis 142.

Where there is considerable stock to be ground off a tooth surface, a tooth may be fed back and forth over the grinding wheel several times before it is indexed and, if this is done, the gear may be advanced step by step into the grinding wheel after each feed movement about the axis 142, by slight rotation of the gear on its own axis 146. This advances the tooth surface to be ground step by step into the wheel to permit step by step grinding off of the desired amount of stock. After a tooth surface has been ground, the gear may be swung clear of the wheel and indexed.

Figure 12:
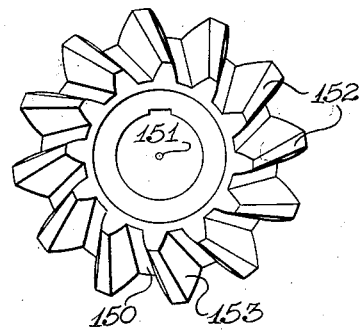
Fig. 12 is a plan view of a skew bevel gear made according to this invention.

Figs. 12 to 15 inclusive illustrate an application of the invention to the production of skew bevel gears. In Fig. 12, I have shown a skew bevel gear 150. The axis of this gear is denoted at 151 and its teeth are designated at 152. The opposite sides of the teeth of this gear are of circular arcuate curvature.

Figure 13:
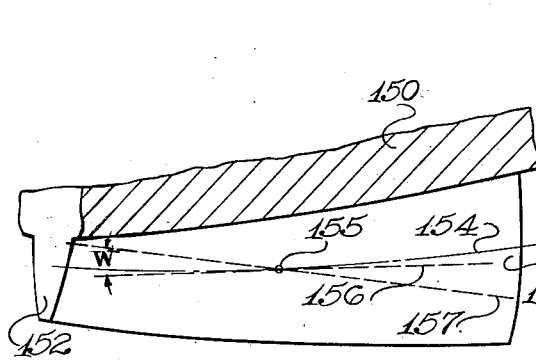
Fig. 13 is a perspective view on an enlarged scale of one of the teeth of this gear, illustrating diagrammatically certain of the principles of the invention.

In Fig. 13, a tooth 152 of the gear is shown on an enlarged scale. 154 denotes the pitch line on side surface 153 of the tooth and 155 is a mean point in the tooth surface. 156 denotes a tangent to the pitch line 154 at mean point 155. 157 denotes the normal projection to the tooth surface of the instantaneous axis of rotation of the gear when in mesh with its mate. 157 is also the line of instantaneous contact between the mating tooth surfaces of a pair of fully matched skew bevel gears and in principle could be made a straight line element of the mating tooth surfaces. Preferably, however, a pair of gears made according to this invention are provided with a slight lengthwise mismatch or localization of tooth bearing in accordance with the principles of my prior patent already mentioned.

To obtain the desired localization of lengthwise tooth bearing, the tooth surfaces of the gear 150 are so cut by lengthwise movement of the cutting tool that a straight line element of a tooth surface is inclined to the pitch line tangent 156 at an angle which is greater than the angle W of inclination of the instantaneous axis 157 to the tangent 156. The mating gear is then cut so that the straight line elements of each of its tooth surfaces is inclined to the tangent 156 at an angle which is less than the angle W by an angle which may or may not, as desired, be equal to the angle at which the straight line elements of the tooth surface of the gear 150 are inclined to the instantaneous axis 157.

Figure 14:
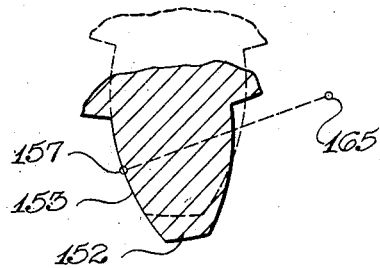
Fig. 14 is a diagrammatic view showing a section taken midway the length of the tooth of Fig. 13 and showing also in dotted lines an end view of the tooth at the large end thereof.

In Fig. 14, I have shown a section taken midway of the skew gear tooth 152 and superimposed upon a dotted line view of the large end of the tooth. The axis of the cylindrical side surface 153 of the tooth is indicated at 165. Since the straight line element 157 of the tooth surface is inclined to the pitch surface of the gear, the axis 165 will also be inclined to the pitch line and at the angle required to produce a tooth surface having the desired localization of tooth bearing. This construction is illustrated in Fig. 14, for it will be seen that the top of the tooth at the middle of the tooth extends further away from the straight line element 157 of the tooth surface than does the top of the tooth at the large end of the tooth.

Figure 15:
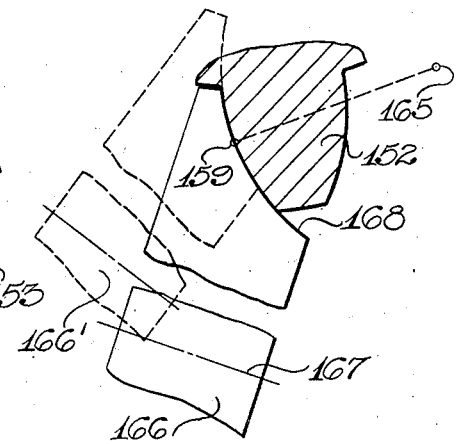
Fig. 15 is a diagrammatic view illustrating one method of cutting or grinding the teeth of a skew bevel gear.

Skew bevel gears made according to this invention may be produced in various ways. One prime advantage of making such gears with cylindrical side tooth surfaces is that they can readily be produced with a formed milling cutter or grinding wheel. This is illustrated in Fig. 15. The milling cutter or grinding wheel is denoted at 166 and its axis at 167. The cutter or grinding wheel is provided with a concave operating surface 168 whose radius 169—165 corresponds to the radius of the cylindrical tooth surface to be ground. In cutting or grinding the gear, the cutter or grinding wheel is rotated on its axis 167 and moved longitudinally of the tooth surface and simultaneously therewith is rocked about the axis 165 so that as it moves from the small to the large end of the tooth, it will cut or grind the tooth to the desired depth. In Fig. 15, two positions of the cutter or grinding wheel are shown. The full line position is the position which the cutter or wheel occupies when it is grinding midway the length of the gear tooth. The dotted line position, denoted at 166′, is the position which the cutter or grinding wheel occupies when grinding at the large end of the tooth, that is, the position corresponding to the dotted line position of the tooth shown in Fig. 14. As before, when a tooth surface has been ground, the cutter or wheel is withdrawn from engagement with the blank and the gear is indexed and when one side of all the teeth of the cutter have been ground, the wheel or cutter and the blank can be readjusted to permit grinding of the opposite sides of the teeth.

In another important modification of the invention, tapered gears are formed with skew teeth which have lengthwise mismatch or localization of tooth bearing and which have conical side tooth surfaces whose axes are so located that the cone element, which is at the lowest point on the side of the tooth surface, follows the direction of the tooth bottom. The tooth surfaces of such a gear can be produced without rocking the cutter or grinding wheel about the tooth surface axis as it moves from one end of the tooth to the other end and as is required in the process illustrated in Fig. 15. In the modification referred to, the tool can follow the cone element as it moves across the face of the blank on each stroke. The depthwise feed movement of the tool on successive strokes will take place, however, about the axis of the conical tooth surface to be cut.

In the modification of the invention here referred to, the mean element of the conical tooth surface is disposed to follow the pitch line tangent 156 (Fig. 13) more closely than the line 157. This design of teeth for bevel gears lends itself especially to the production of the gears in a planing process. The tool, whose cutting edge may be either straight or concave, is reciprocated along the length of the tooth and is fed relative to the gear blank about the axis of the conical surface which it is desired to produce on the tooth. This axis is, of course, inclined to the direction of the longitudinal movement of the tool at the cone angle of the tooth surface.

While several different embodiments of the invention have been described, it will be understood that the invention is capable of still further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting a gear which comprises reciprocating a tool, which has a side cutting edge of concave circular arcuate shape, along the length of a tooth surface of a gear blank while holding the blank stationary on its axis and while effecting a relative circular depthwise feed movement between the tool and blank about a relatively fixed axis other than the axis of the blank, that extends in a direction generally longitudinal of the tooth surface being cut, to cut a tooth surface whose profile is curved about said fixed axis.

2. The method of cutting a gear which comprises reciprocating a tool, which has a side cutting edge of concave circular arcuate shape, along the length of a tooth surface of a gear blank while producing a relative swinging depthwise feed movement between the tool and blank about a relatively fixed axis other than the blank axis that extends in a direction generally longitudinal of the tooth surface being cut to cut the tooth surface to its full height, the radius of curvature of the cutting edge of the tool being greater than the radius of relative swing of the tool and blank during the feed movement.

3. The method of producing a gear which comprises positioning a pair of tools, that have side-cutting edges, so that they will operate simultaneously on opposite sides of spaced teeth of a gear blank, imparting cutting motions to the tools longitudinally of the teeth of the blank, and producing a relative rolling movement between the tools and blank as though a circle concentric with the blank were rolling on a stationary circle twice its diameter so as to cut the teeth to their full heights.

4. The method of producing a gear which comprises reciprocating a tool, that has a side-cutting edge, along the length of a tooth surface of the blank while holding the blank stationary on its axis and while effecting a relative depthwise swinging feed movement between the tool and blank about an axis other than the blank axis that extends in a direction generally longitudinal of the tooth surface which is being cut but which is inclined to the pitch surface of the gear which is being cut to produce a tooth surface on the blank of circular arcuate profile curvature.

5. The method of producing a gear which comprises reciprocating a tool, that has a side-cutting edge, across the face of a gear blank while producing a relative circular movement between the tool and blank on each pass of the tool, about a relatively fixed axis other than the blank axis which extends in a direction generally longitudinal of the tooth surface being cut to cause the tip of the tool to travel parallel to the root surface of a tooth space of the gear, and producing a relative circular depthwise feed movement between the tool and blank about the same axis to cause the tooth surface to be cut to full depth.

6. The method of producing a gear with side tooth surfaces of circular arcuate profile shape which comprises employing a tool that has a side cutting edge of concave circular arcuate profile shape whose radius of profile curvature is greater than the radius of profile curvature of the tooth surface to be cut, and reciprocating said tool across the face of a gear blank while effecting on each stroke of the tool a relative circular movement between the tool and blank about an axis other than the blank axis that extends in a direction generally longitudinal of the tooth surface to be cut and which constitutes the axis of profile curvature of said tooth surface, and effecting a relative depthwise feed movement between the tool and blank about said axis, to cut the tooth surface to full depth.

7. The method of producing a gear with side tooth surfaces of circular arcuate profile shape which comprises rotating a tool that has an operating surface of circular arcuate profile shape in engagement with a gear blank while producing a relative reciprocatory movement between the tool and blank in the lengthwise direction of the tooth surface to be produced and effecting on each stroke of the tool a relative circular feed movement between the tool and blank about an axis other than the blank axis extending in the general direction of longitudinal movement of the tool and constituting the axis of profile curvature of the tooth surface which is being cut, to cut a tooth surface to full depth.

8. The method of producing the tooth surfaces of a gear which comprises giving a cutting tool, which has a side-cutting edge, a cutting motion longitudinally of the tooth surface to be cut, while producing a relative depthwise feed movement between the tool and the gear blank about a relatively fixed axis other than the blank axis that extends in a direction generally longitudinal of the tooth surface being cut, to cut the tooth surface to its full height.

9. The method of producing tooth surfaces of a gear which comprises giving a cutting tool, which has a side-cutting edge, a cutting motion longitudinally of the tooth surface to be cut, while producing a relative depthwise feed movement between the tool and gear blank about a relatively fixed axis that extends in a direction generally longitudinal of a tooth surface but is inclined to the direction of longitudinal cutting movement of the tool.

10. The method of producing tooth surfaces of a gear which comprises giving a cutting tool, which has a side-cutting edge of concave circular arcuate profile shape, a cutting motion longitudinally of a tooth surface to be cut, while producing a relative depthwise feed movement between the tool and the gear blank about a relatively fixed axis that extends in the general longitudinal direction of the tooth surface to be cut, but is inclined to the direction of cutting movement of the tool.

11. The method of producing tooth surfaces of a gear which comprises giving a cutting tool, which has a side-cutting edge of concave circular arcuate profile shape, a cutting motion longitudinally of the tooth surface to be cut while producing a relative depthwise feed movement between the tool and gear blank about a relatively fixed axis other than the blank axis that extends in a direction parallel to the direction of longitudinal cutting movement of the tool.

12. The method of producing tooth surfaces of a gear which comprises reciprocating a cutting tool, which has a side cutting edge of concave profile shape, longitudinally of a tooth surface to be cut while swinging said tool about an axis extending in the general direction of the tooth but inclined to the pitch line thereof to cause the tip of the tool to travel parallel to the root surface of a tooth space of the blank, and imparting a relative swinging movement between the tool and blank about said axis to cut the tooth surface to its full height.

13. The method of producing tooth surfaces of a gear which comprises reciprocating a cutting tool, which has a side-cutting edge, longitudinally of a tooth surface to be cut while swinging said tool about an axis extending in the general longitudinal direction of the tooth surface but inclined to the pitch line thereof and inclined to the direction of reciprocation of the tool, and imparting a relative depthwise swinging movement between the tool and blank about said axis to cut the tooth surface its full height.

14. The method of finish-cutting a tooth surface of a gear which comprises giving a cutting tool, which has a side-cutting edge, a cutting motion longitudinally of the tooth surface to be cut, while producing a relative swinging movement between the tool and blank outwardly of the tooth surface from the root to the tip thereof about a relatively fixed axis other than the blank axis that extends in a direction generally longitudinal of the tooth surface being cut.

15. The method of finish-cutting a tooth surface of a gear which comprises giving a cutting tool, which has a side-cutting edge of concave profile shape, a cutting motion longitudinally of the tooth surface to be cut, while producing a relative swinging movement between the tool and the gear blank outwardly of the tooth surface from the root to the tip thereof about a relatively fixed axis other than the blank axis that extends in a direction generally longitudinal of the tooth surface being cut.

16. The method of finish-cutting a tooth surface of a gear which comprises reciprocating a cutting tool, which has a side-cutting edge of concave circular arcuate profile shape, longitudinally of the tooth surface to be cut, while producing a relative movement between the tool and gear blank outwardly of the tooth surface from the root to the tip thereof about a relatively fixed axis other than the blank axis that extends in a direction generally longitudinal of the tooth surface being cut, the radius of curvature of the side-cutting edge of the tool being greater than the radius of relative swing of the tool and blank during said feed motion.

ERNEST WILDHABER.